United States Patent
Takagi

(10) Patent No.: US 8,209,348 B2
(45) Date of Patent: Jun. 26, 2012

(54) INFORMATION PROCESSING APPARATUS, INFORMATION PROCESSING METHOD, AND INFORMATION PROCESSING PROGRAM

(75) Inventor: Tsuyoshi Takagi, Kanagawa (JP)

(73) Assignee: Sony Corporation (JP)

( * ) Notice: Subject to any disclaimer, the term of this patent is extended or adjusted under 35 U.S.C. 154(b) by 473 days.

(21) Appl. No.: 12/074,003

(22) Filed: Feb. 29, 2008

(65) Prior Publication Data

US 2008/0215526 A1 Sep. 4, 2008

(30) Foreign Application Priority Data

Mar. 2, 2007 (JP) ................. P2007-052626

(51) Int. Cl.
*G06F 17/30* (2006.01)
(52) U.S. Cl. ...................... 707/769; 725/137
(58) Field of Classification Search .............. None
See application file for complete search history.

(56) References Cited

U.S. PATENT DOCUMENTS

| | | | | |
|---|---|---|---|---|
| 7,321,899 | B2 * | 1/2008 | Saito et al. ......................... | 1/1 |
| 7,860,895 | B1 * | 12/2010 | Scofield et al. ................ | 707/802 |
| 2005/0060145 | A1 * | 3/2005 | Abe et al. ....................... | 704/211 |
| 2006/0036589 | A1 * | 2/2006 | Okuda et al. ...................... | 707/3 |
| 2006/0047678 | A1 * | 3/2006 | Miyazaki et al. ............. | 707/102 |
| 2008/0071542 | A1 * | 3/2008 | Yu ................................. | 704/270 |

FOREIGN PATENT DOCUMENTS

| | | |
|---|---|---|
| JP | 10042236 A | 2/1998 |
| JP | 10285528 A | 10/1998 |
| JP | 2001101195 | 4/2001 |
| JP | 2002279026 | 9/2002 |
| JP | 2004032349 A | 1/2004 |
| JP | 2005295375 A | 10/2005 |
| JP | 2006054747 A | 2/2006 |
| JP | 2006129122 A | 5/2006 |
| JP | 2006155336 A | 6/2006 |
| JP | 2007028312 A | 2/2007 |

* cited by examiner

*Primary Examiner* — Neveen Abel Jalil
*Assistant Examiner* — Kevin L Young
(74) *Attorney, Agent, or Firm* — Lerner, David, Littenberg, Krumholz & Mentlik, LLP

(57) ABSTRACT

In an information processing apparatus, an acquisition unit acquires a keyword, and a calculation unit calculates the importance level of each keyword by adding a value determined depending on an increase in the number of occurrences to the importance level and subtracting a value determined depending on an increase in the difference between a current time and a last acquisition time to the importance level. An extraction unit extracts text information of a subtitle in a program. A subtitle morphological analysis unit morphologically analyzes the text information of the subtitle. A comparison unit compares each acquired keyword with each keyword detected via the morphological analysis. A recording unit records the program if the comparison indicates that any acquired keyword is identical to any keyword detected via the morphological analysis. A registration unit registers the recorded program and information indicating the importance level in a table in association with the keyword.

10 Claims, 13 Drawing Sheets

FIG. 9

| TOPIC KEYWORD | CHANNEL | IMPORTANCE LEVEL |
|---|---|---|
| GENERAL ELECTION | 6 | 6 |

| TOPIC KEYWORD | IMPORTANCE LEVEL | TOTAL NUMBER OF CONTENTS | CONTENT ID |
|---|---|---|---|
| GENERAL ELECTION | 6 | 1 | 00001 |

| CONTENT ID | TITLE NAME | CHANNEL | RECORD START TIME | RECORD END TIME |
|---|---|---|---|---|
| 00001 | NEWS XX | 6 | 06/13:10:15 | 06/13:20:00 |

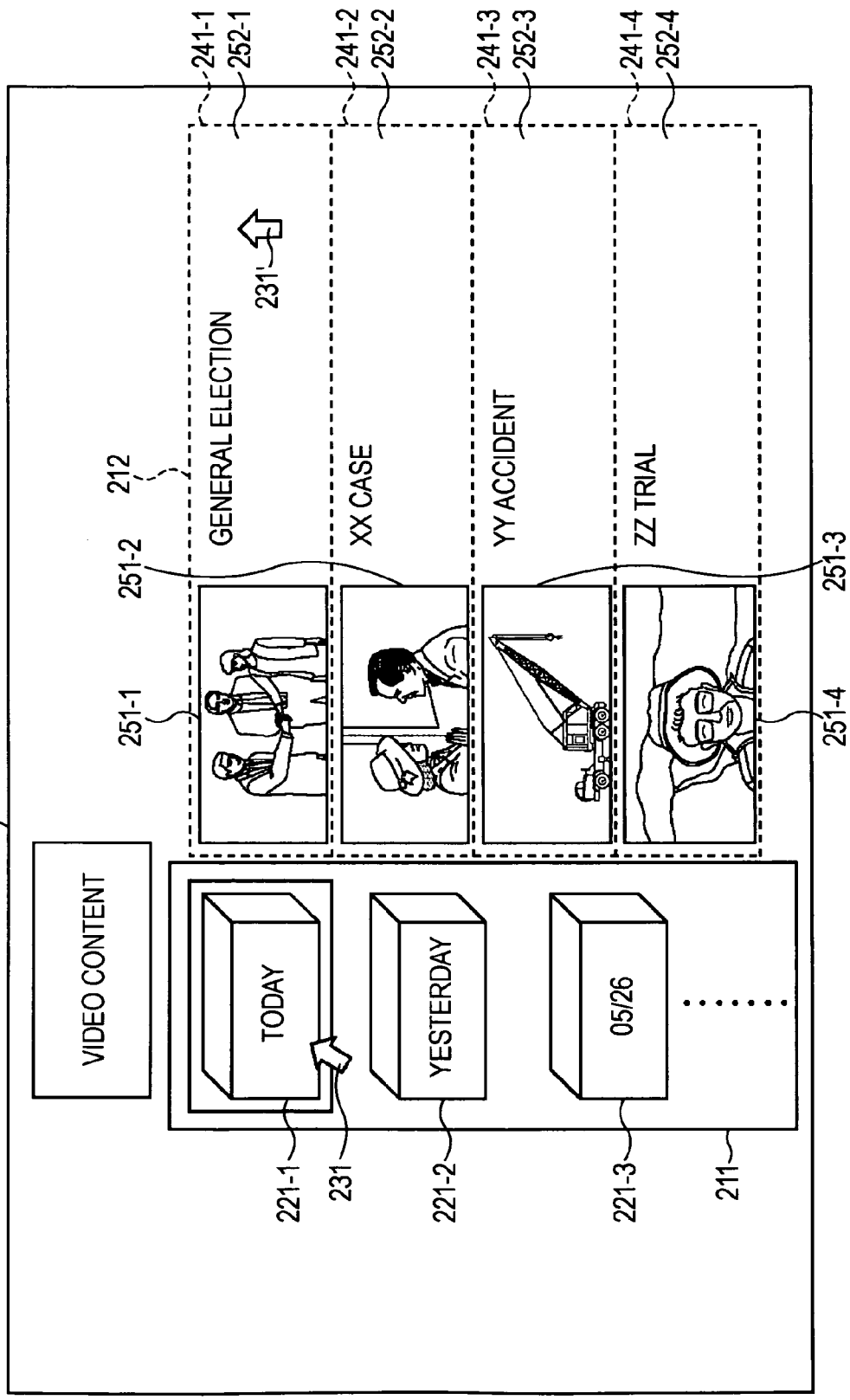

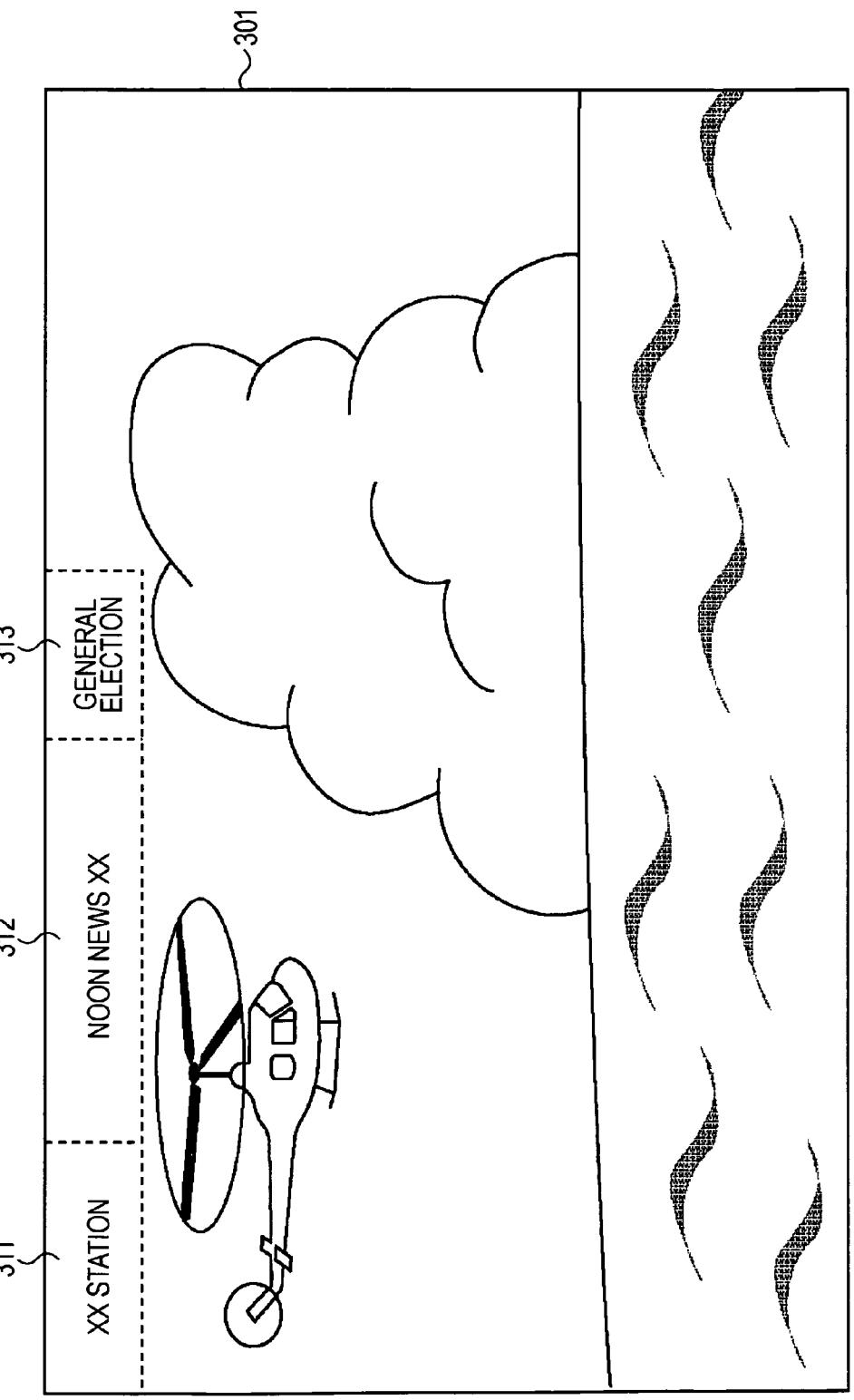

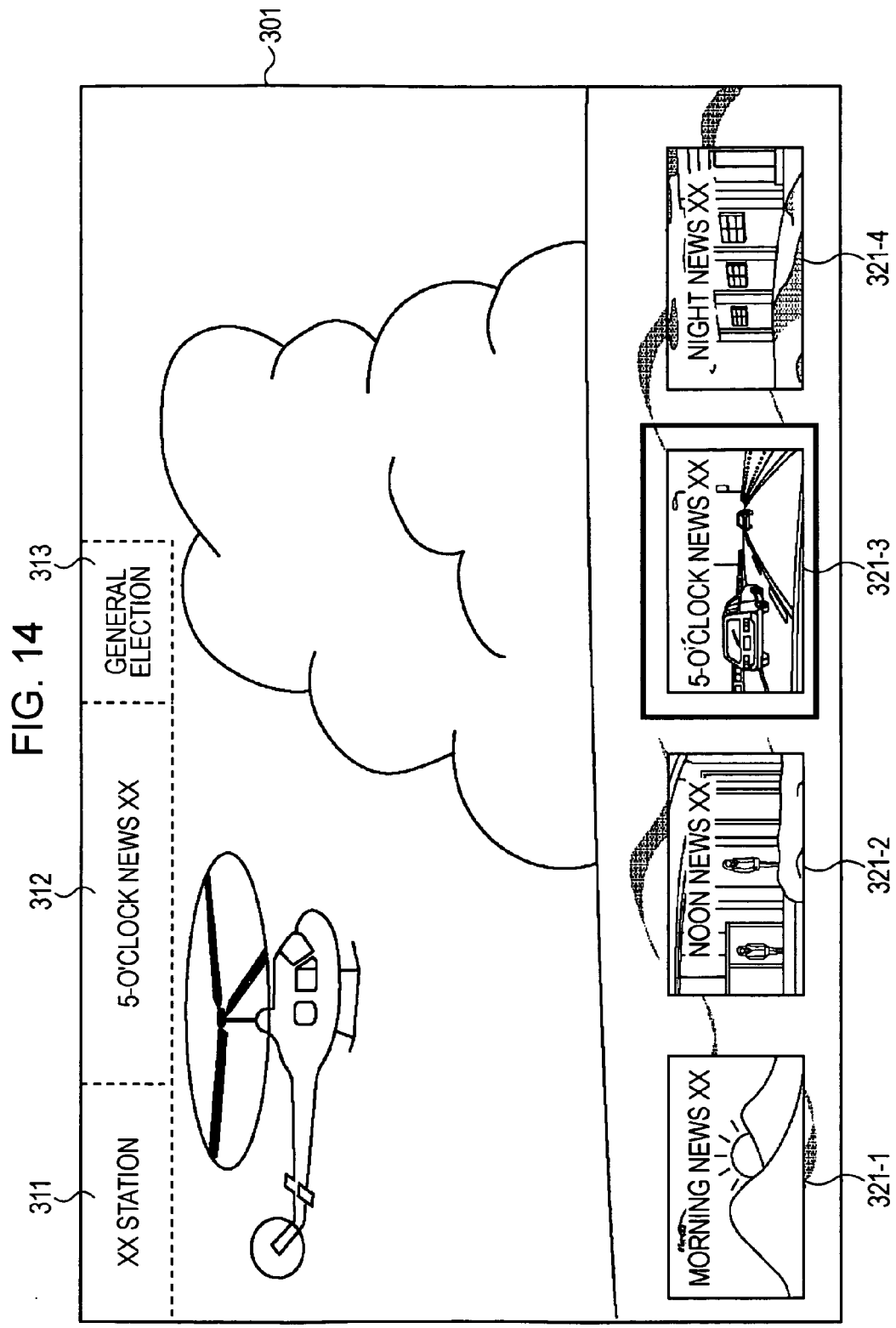

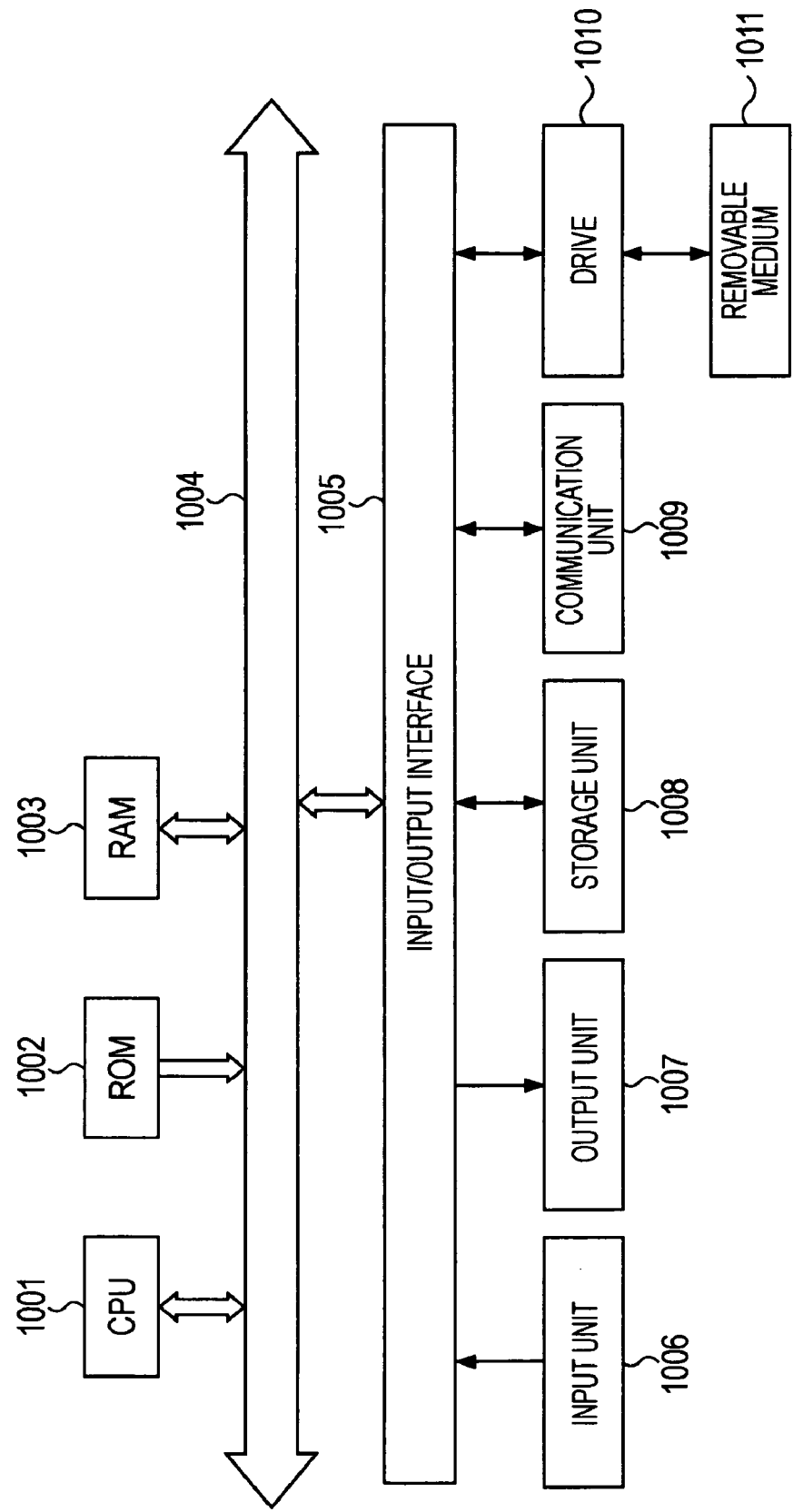

INFORMATION PROCESSING APPARATUS, INFORMATION PROCESSING METHOD, AND INFORMATION PROCESSING PROGRAM

CROSS-REFERENCE TO RELATED APPLICATIONS

The present application claims priority from Japanese Patent Application No. JP 2007-052626, filed in the Japanese Patent Office on Mar. 2, 2007, the entire content of which is incorporated herein by reference.

BACKGROUND OF THE INVENTION

1. Field of the Invention

The present invention relates to an information processing apparatus, an information processing method, and an information processing program, and more particularly, to an information processing apparatus, an information processing method, and an information processing program, capable of recording and/or playing back a scene of a particular topic in a program of a particular topic.

2. Description of the Related Art

Various techniques have been proposed to detect a program of a particular topic and record/play back the program. Note that in the present description, the term "program" is used to generically describe various kinds of broadcast programs such as a television program, unless differentiating the "program" in this sense from a computer program is required.

For example, it has been proposed to produce data representing topics of news in accordance with a change with time in occurrence frequency of words appearing in news sentences, and search for television programs associated with topics (see, for example, Japanese Unexamined Patent Application Publication No. 2001-101195).

It has also been proposed to provide a list of messages or comments about programs talked on the Internet thereby to allow a user to easily know responses of other users to programs thereby providing information helpful in selecting programs (see, for example, Japanese Unexamined Patent Application Publication No. 2002-279026).

SUMMARY OF THE INVENTION

In the techniques described above, it is difficult to selectively record or play back a particular scene of a topic in a program, although it is possible to record the whole program. Therefore, after a program including a scene of a particular topic is recorded, a user has to view the whole program to find the scene of the particular topic. In a case where the scene of the topic is located near the end of the program, it takes a time almost equal to the total time of the program to find the scene.

In view of the above, it is desirable to provide a technique to record and/or play back a scene of a particular topic.

According to an embodiment of the present invention, there is provided an information processing apparatus including acquisition means for acquiring one or more distributed keywords, a calculation unit adapted to calculate the importance level of each keyword acquired by the acquisition unit by adding a value determined depending on an increase in the number of occurrences to the importance level and subtracting a value determined depending on an increase in the difference between a current time and a last acquisition time to the importance level, extraction means for extracting text information of a subtitle included in a program, subtitle morphological analysis means for performing morphological analysis on the text information of the subtitle, comparison means for comparing each keyword acquired by the acquisition means with each keyword detected via the morphological analysis performed by the subtitle morphological analysis means, recording means for recording the program if the comparison performed by the comparison means indicates that any keyword acquired by the acquisition means is identical to any keyword detected via the morphological analysis performed by the subtitle morphological analysis means, and registration means for registering, in a table, the program recorded by the recording means and information indicating the importance level in association with the keyword.

The information processing apparatus may further include display means for displaying information associated with one or more programs registered in the table, in the order of decreasing importance level of topic keywords and in the order of decreasing freshness of time of recording.

The information processing apparatus may further include selection means for selecting information associated with a program registered in the table from one or more pieces of information displayed by the display means, and playback means for playing back the program selected by the selection means.

According to an embodiment of the present invention, there is provided an information processing method comprising the steps of acquiring one or more distributed keywords, calculating the importance level of each keyword acquired in the acquisition step, by adding a value determined depending on an increase in the number of occurrences to the importance level and subtracting a value determined depending on an increase in the difference between a current time and a last acquisition time to the importance level, extracting text information of a subtitle included in a program, performing morphological analysis on the text information of the subtitle, comparing each keyword acquired in the acquisition step with each keyword detected via the morphological analysis performed in the subtitle morphological analysis step, recording the program if the comparison performed in the comparison step indicates that any keyword acquired in acquisition step is identical to any keyword detected via the morphological analysis performed in the subtitle morphological analysis step, and registering, in a table, the program recorded by the recoding step and information indicating the importance level in association with the keyword.

According to an embodiment of the present invention, there is provided a computer program executable by a computer to perform a process including the steps of acquiring one or more distributed keywords, calculating the importance level of each keyword acquired in the acquisition step, by adding a value determined depending on an increase in the number of occurrences to the importance level and subtracting a value determined depending on an increase in the difference between a current time and a last acquisition time to the importance level, extracting text information of a subtitle included in a program, performing morphological analysis on the text information of the subtitle, comparing each keyword acquired in the acquisition step with each keyword detected via the morphological analysis performed in the subtitle morphological analysis step, recording the program if the comparison performed in the comparison step indicates that any keyword acquired in acquisition step is identical to any keyword detected via the morphological analysis performed in the subtitle morphological analysis step, and registering, in a table, the program recorded by the recoding step and information indicating the importance level in association with the keyword.

The computer program may be stored in a storage medium.

In the information processing apparatus, the information processing method, and the computer program, distributed keywords are acquired, the importance level of each acquired keyword is calculated by adding the value determined depending on an increase in the number of occurrences to the importance level and subtracting the value determined depending on an increase in the difference between the current time and the last acquisition time to the importance level, text information of a subtitle included in a program is extracted, morphological analysis is performed on the text information of the subtitle, each acquired keyword is compared with each keyword detected via the morphological analysis, the program is recorded if the comparison indicates that any acquired keyword is identical to any keyword detected via the morphological analysis, and the recorded program and information indicating the importance level are registered in the table in association with the keyword.

Note that the information processing apparatus may be in the form of a standalone apparatus or may be a block.

As described above, the present invention provides the great advantage that a scene of a particular topic in a program can be recorded and played back.

BRIEF DESCRIPTION OF THE DRAWINGS

FIG. 9 is a diagram provided for an explanation of a keyword-based recording process;

FIG. 12 is a diagram illustrating an example of a GUI screen;

FIG. 13 is a diagram illustrating an example of playback screen;

FIG. 14 is a diagram illustrating an example of playback screen; and

FIG. 15 is a diagram illustrating an example of a configuration of a personal computer.

DESCRIPTION OF THE PREFERRED EMBODIMENTS

Before describing embodiments of the present invention, the correspondence between the features of the invention and the specific elements disclosed in embodiments of the present invention is discussed below. This description is intended to assure that embodiments supporting the invention are described in this specification. Thus, even if an element in the following embodiments is not described as relating to a certain feature of the present invention, that does not necessarily mean that the element does not relate to that feature of the invention. Conversely, even if an element is described herein as relating to a certain feature of the invention, that does not necessarily mean that the element does not relate to other features of the invention.

Also note that it should be understood that some examples described in the embodiments can correspond to no claims. In other words, there can be a claim that correspond to an example described in the embodiments but that is not included in the current claims, that is, there can be a future claim presented by means of division or amendment of application.

Figure 1:
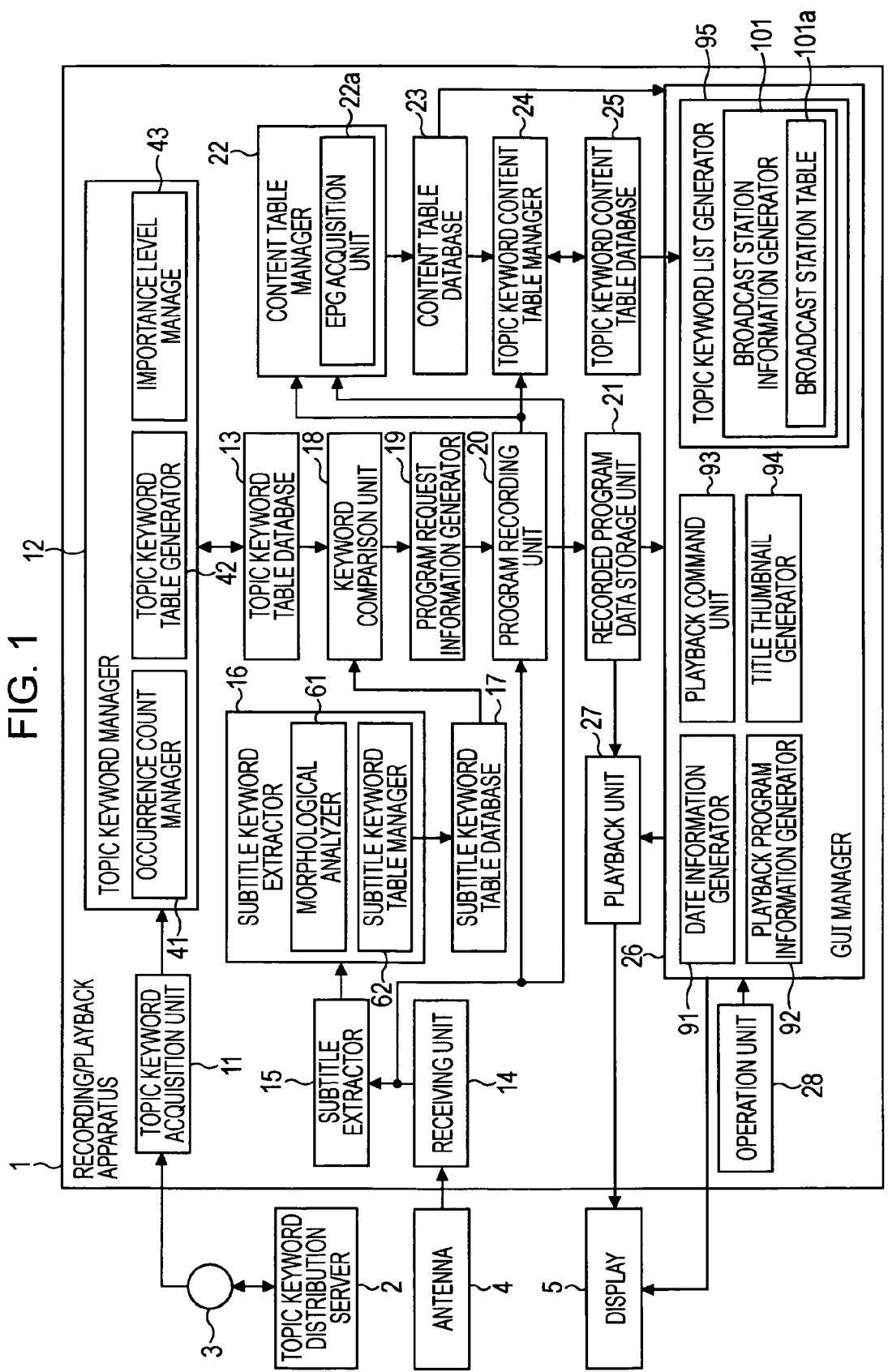
FIG. 1 is a block diagram illustrating an example of a configuration of a recording/playback apparatus according to an embodiment of the present invention.

According to an embodiment of the present invention, there is provided an information processing apparatus including acquisition means (for example, a topic keyword acquisition unit 11 shown in FIG. 1) for acquiring one or more distributed keywords, calculation means (for example, an importance level manager 43 shown in FIG. 1) for calculating the importance level of each keyword acquired by the acquisition means by adding a value determined depending on an increase in the number of occurrences to the importance level and subtracting a value determined depending on an increase in the difference between a current time and a last acquisition time to the importance level, extraction means (for example, a subtitle extractor 15 shown in FIG. 1) for extracting text information of a subtitle included in a program, subtitle morphological analysis means (for example, a morphological analyzer 61 shown in FIG. 1) for performing morphological analysis on the text information of the subtitle, comparison means (for example a keyword comparison unit 18 shown in FIG. 1) for comparing each keyword acquired by the acquisition means with each keyword detected via the morphological analysis performed by the subtitle morphological analysis means, 1 recording means (for example, a program recording unit 20 shown in FIG. 1) for recording the program if the comparison performed by the comparison means indicates that any keyword acquired by the acquisition means is identical to any keyword detected via the morphological analysis performed by the subtitle morphological analysis means, and registration means (for example, a topic keyword content table manager 24 shown in FIG. 1) for registering, in a table, the program recorded by the recording means and information indicating the importance level in association with the keyword.

The information processing apparatus may further include display means (for example, a topic keyword list generator 95 shown in FIG. 1) for displaying information associated with one or more programs registered in the table, in the order of decreasing importance level of topic keywords and in the order of decreasing freshness of time of recording.

The information processing apparatus may further include selection means (for example, an operation unit 28 shown in FIG. 1) for selecting information associated with a program registered in the table from one or more pieces of information displayed by the display means, and playback means (for example, a playback unit 27 shown in FIG. 1) for playing back the program selected by the selection means.

Figure 8:
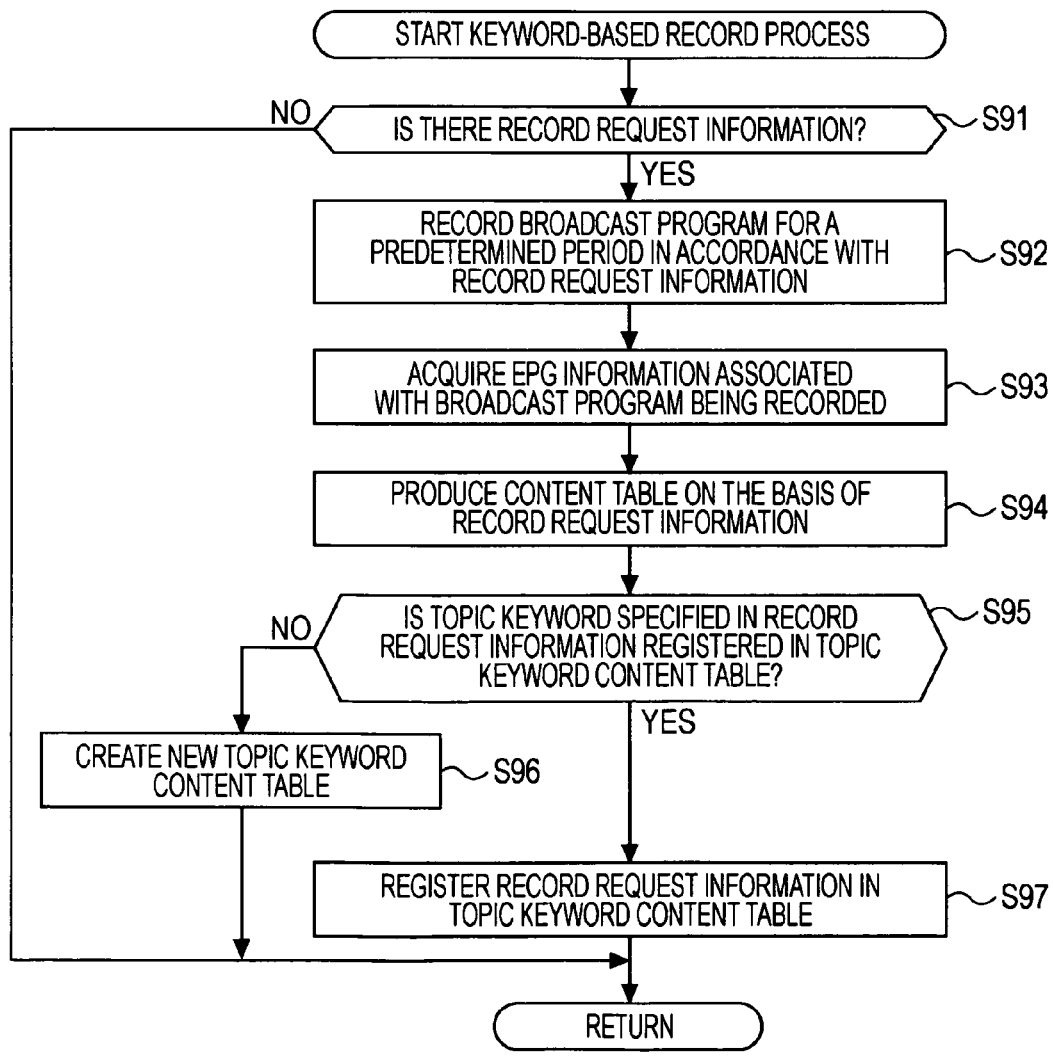
FIG. 8 is a flow chart associated with a keyword-based recording process.

According to an embodiment of the present invention, there is provided an information processing method including the steps of acquiring one or more distributed keywords (for example, in step S31 shown in FIG. 3), calculating the importance level of each keyword acquired in the acquisition step, by adding a value determined depending on an increase in the number of occurrences to the importance level and subtracting a value determined depending on an increase in the difference between a current time and a last acquisition time to the importance level (for example, in step S39 in FIG. 3), extracting text information of a subtitle included in a program (for example, in step S52 in FIG. 5), performing morphological analysis on the text information of the subtitle (for example, in step S53 in FIG. 5), comparing each keyword acquired in the acquisition step with each keyword detected via the morphological analysis performed in the subtitle morphological analysis step (for example, in step S73 in FIG. 6), recording the program if the comparison performed in the comparison step indicates that any keyword acquired in acquisition step is identical to any keyword detected via the morphological analysis performed in the subtitle morphological analysis step (for example, in step S92 in FIG. 8), and registering, in a table, the program recorded by the recoding step and information indicating the importance level in association with the keyword (for example, in steps S96 and S97 in FIG. 8).

FIG. 1 illustrates a recording/playback apparatus according to an embodiment of the present invention.

The recording/playback apparatus 1 shown in FIG. 1 is configured to receive a topic keyword distributed by a topic keyword distribution server 2 via a network 3 such as the Internet. In accordance with the received topic keyword, a scene of a topic represented by the topic keyword in a program received via an antenna 4 is recorded. The recorded scene is displayed on the display 5.

A topic keyword acquisition unit 11 acquires topic keywords transmitted at particular intervals from the topic keyword distribution server 2 via the network 3, and supplies the acquired topic keywords to a topic keyword manager 12.

The topic keyword manager 12 determines the importance level of each acquired topic keyword, describes the importance level in a topic keyword table, and stores the topic keyword table in a topic keyword table database 13.

In the topic keyword manager 12, a number-of-occurrences manager 41 counts the number of occurrences of each supplied topic keyword and updates the topic keyword table database 13 in accordance with the result.

If a topic keyword table generator 42 detects a new topic keyword in the received topic keywords, the topic keyword table generator 42 creates a topic keyword table for registration of an importance level in association with the detected new topic keyword, and the topic keyword table generator 42 registers the created topic keyword table in the topic keyword table database 13.

An importance level manager 43 updates the importance level each time a topic keyword is supplied such that a value determined depending on the number of occurrences is added to the importance level, and the time difference between the current time and the last acquisition time is calculated and a value determined depending on the calculated time difference is subtracted from the importance level.

A receiving unit 14 extracts a signal of a channel from broadcast waves received via an antenna 4, and supplies the extracted signal to a subtitle extractor 15, a program recording unit 20, and a content table manager 22.

The subtitle extractor 15 extracts subtitle information of a broadcast program from the signal of the channel supplied from the receiving unit 14, and supplies the extracted subtitle information to a subtitle keyword extractor 16.

The subtitle keyword extractor 16 extracts keywords from the subtitle information supplied from the subtitle extractor 15, and stores the extracted keywords in a subtitle keyword table database 17.

In the subtitle keyword extractor 16, a morphological analyzer 61 performs morphological analysis on the text data of the subtitle information extracted by the subtitle extractor 15, and divides the text data into morphemes (hereinafter, the morphemes will be referred to keywords). The morphological analyzer 61 then determines the part of speech of each keyword.

A subtitle keyword table manager 62 creates a subtitle keyword table for storing keywords in association with the channel and stores the created subtitle keyword table in the subtitle keyword table database 17.

A keyword comparison unit 18 compares keywords described in the topic keyword table stored in the topic keyword table database 13 with keywords described in the subtitle keyword table of each channel stored in the subtitle keyword table database 17 to determine whether there is a keyword included in both keyword tables thereby to determine whether a scene is the topic keyword. The determination result is supplied together with the associated topic keyword to a record request information generator 19.

In a case where the determination result supplied from the keyword comparison unit 18 indicates that the scene is of the topic keyword included in both keyword tables, the record request information generator 19 generates record request information and supplies it to the program recording unit 20.

In accordance with the supplied record request information, the program recording unit 20 records the scene of the program received by the receiving unit 14. The recorded information is stored in a recorded program data storage unit 23, and associated information, including record request information and information indicating a record start time and a record end time, is supplied to the content table manager 22 and a topic keyword content table manager 24.

The content table manager 22 produces a content table in accordance with the record request information and the record start time and the record end time. The produced content table is stored in the content table database 23. Furthermore, the content table manager 22 controls an EPG acquisition unit 22a to read information associated with the program (content) to be registered, and the content table manager 22 registers the read information associated with the program in the content table.

The topic keyword content table manager 24 produces a topic keyword content table on the basis of the record request information and the information described in the content table registered in the content table database 23, and the topic keyword content table manager 24 stores the produced topic keyword content table in topic keyword content table database 25. In this process, the topic keyword content table manager 24 determines whether the topic keyword of interest is already registered in the topic keyword content table database 25. If the topic keyword of interest is found in the topic keyword content table database 25, the topic keyword content table manager 24 updates the associated topic keyword content table registered in the topic keyword content table database 25. However, if the topic keyword of interest is not found, the topic keyword content table manager 24 creates a new topic keyword content table.

A GUI (Graphical User Interface) manager 26 produces a GUI for searching for and playing back recorded programs, in accordance with the content tables registered in the content table database 23, the topic keyword content tables registered in the topic keyword content table database 25, and the recorded program data stored in the recorded program data storage unit 23, and the GUI manager 26 displays the resultant GUI on the display 5.

A date information generator 91 accesses the content table database 23 to read information indicating the dates of the registered content tables and displays the read date information on the display 5.

A playback program information generator 92 reads, from the content table database 23, information associated with the program being read from the recorded program data storage unit 23 and played back by a playback unit 27, and the playback program information generator 92 displays the read information in a superimposed manner.

If a user operates the operation unit 28 to issue a command to play back a content included in the title list produced by the topic keyword list generator 95 and displayed on the display 5, the playback command unit 93 commands the playback unit 27 to play back the specified content.

The title thumbnail image generator 94 reads, from the recorded program data storage unit 23, a frame image including a subtitle corresponding to the record start time for each of programs (contents) included in the title list generated by the topic keyword list generator 95, and the title thumbnail image generator 94 displays the read frame images.

The topic keyword list generator 95 generates the title list of topic keywords in accordance with information described in topic keyword content tables stored in the topic keyword content table database 25 and information described in content tables stored in the content table database 23, and the topic keyword list generator 95 displays the produced title list on the display 5.

In the example shown in FIG. 1, for ease of understanding, the recording/playback apparatus is configured to receive a single channel of broadcast wave. In practice, to receive all channels, the recording/playback apparatus may be configured to include as many sets of receiving and recording parts including the receiving unit 14 and the program recording unit 20 as there are channels, although only one set of receiving and recording parts is shown in FIG. 1. In the case where the recording/playback apparatus is configured to receive only one channel of program at a time, the channel may be sequentially switched at predetermined intervals.

Figure 2:
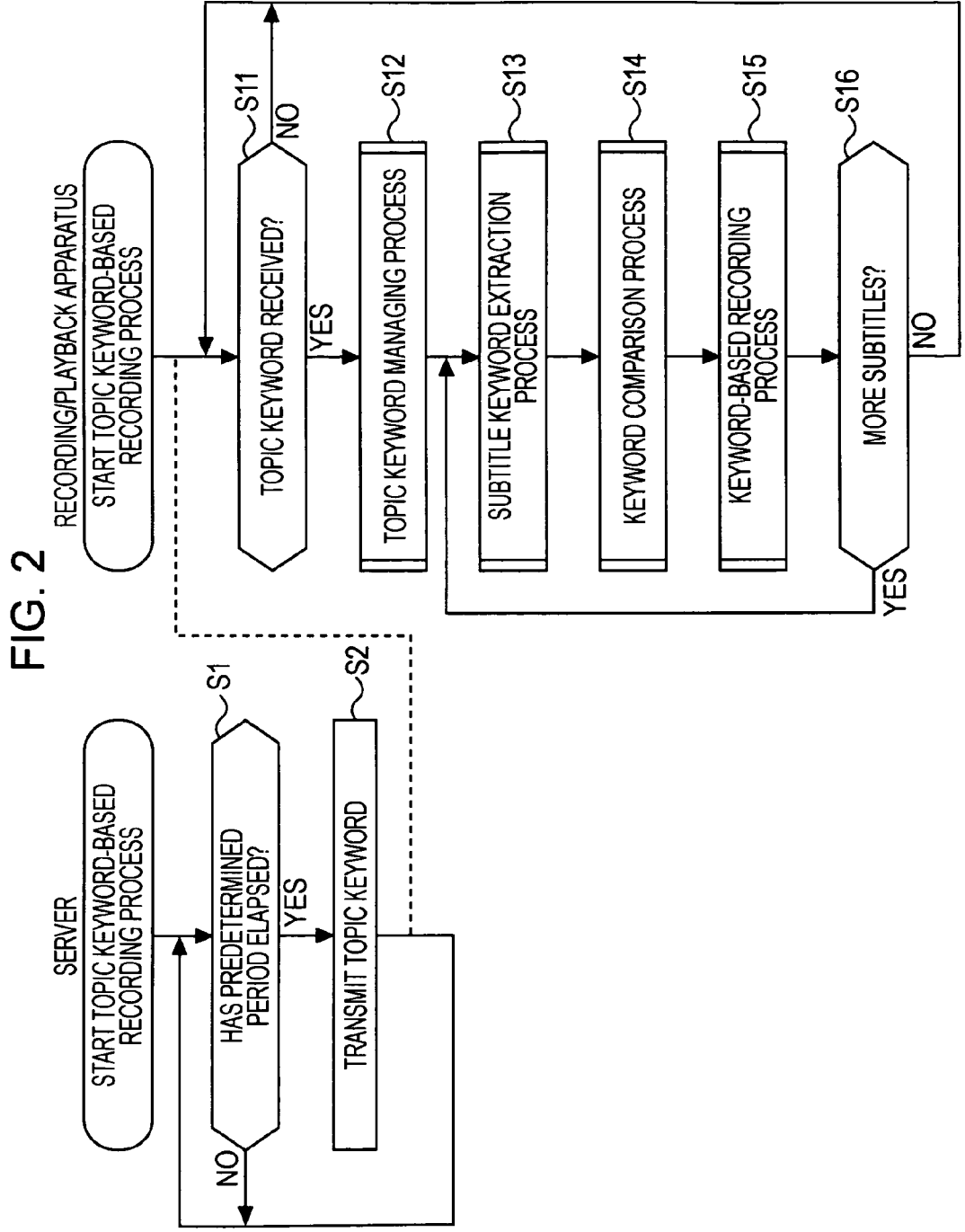
FIG. 2 is a flow chart associated with a topic keyword-based recording process.

A topic keyword-based recording process is described below with reference to a flow chart shown in FIG. 2.

In step S1, the topic keyword distribution server 2 determines whether a predetermined period of time has elapsed. If not so, step S1 is performed repeatedly until it is determined that the predetermined period of time has elapsed. If it is determined in step S1 that the predetermined period of time has elapsed, the process proceeds to step S2. In step S2, the topic keyword distribution server 2 detects a current keyword which has frequently appeared on the network 3 such as the internet, and transmits the detected keyword to the recording/playback apparatus 1.

In step S11, the topic keyword acquisition unit 11 makes a determination, at predetermined intervals, as to whether a topic keyword has been received via the network 3. If no topic keyword has been received, step S11 is performed repeatedly until a topic keyword has been received. In the case where a topic keyword has been transmitted in step S2, the determination in step S11 is made affirmatively, and thus the process proceeds to step S12.

In step S12, a topic keyword managing process is performed.

Figure 3:
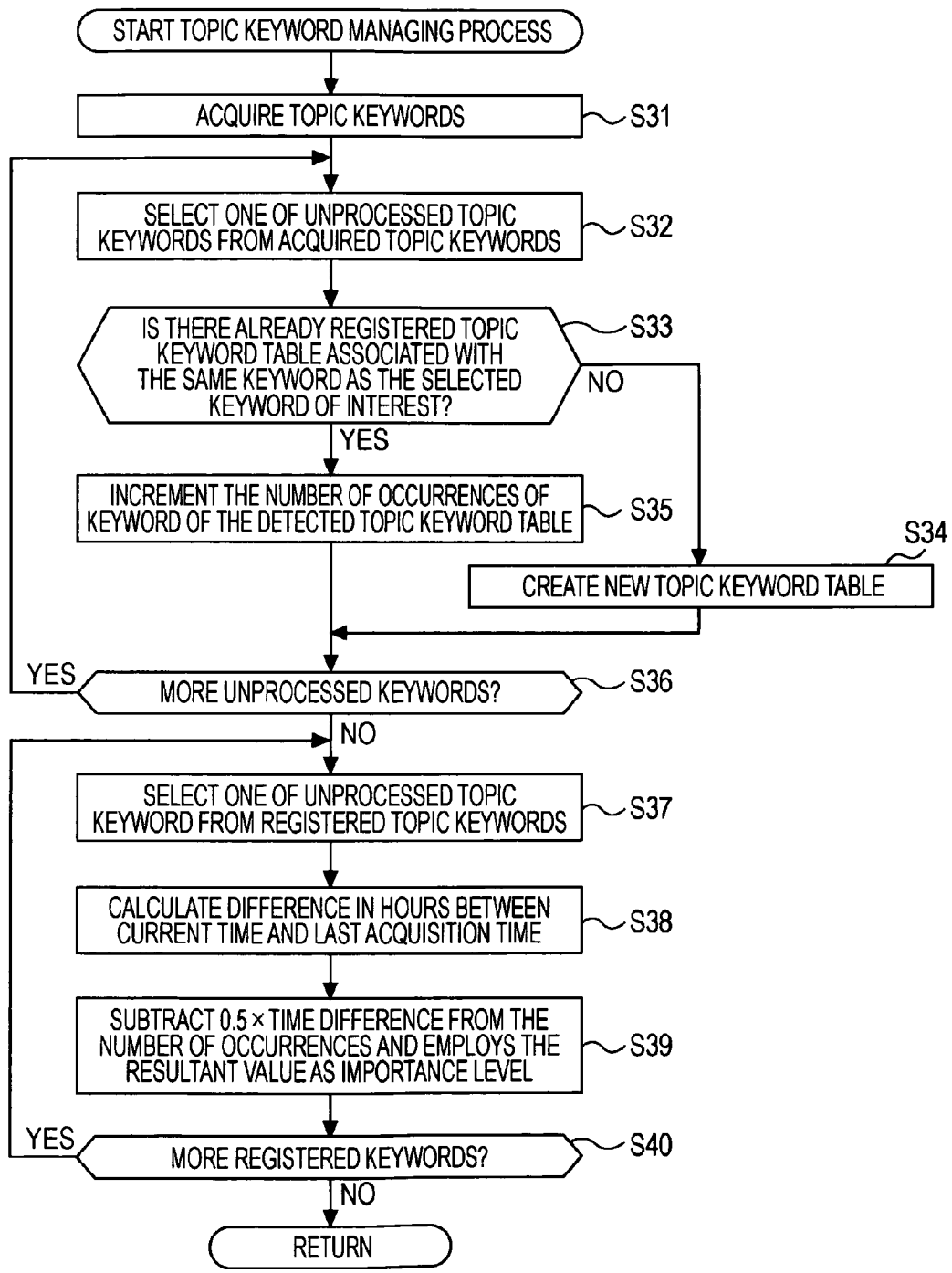
FIG. 3 is a flow chart associated with a topic keyword registration process.

The topic keyword managing process is described below with reference to a flow chart shown in FIG. 3.

In step S31, the topic keyword acquisition unit 11 acquires topic keywords transmitted from the topic keyword distribution server 2, and supplies the acquired topic keyword to the topic keyword manager 12.

In step S32, the topic keyword manager 12 selects one of unprocessed topic keywords from the acquired topic keywords. Hereinafter, the selected topic keyword will be referred to as a topic keyword of interest.

In step S33, the topic keyword manager 12 accesses the topic keyword table database 13 to determine whether the topic keyword of interest has already been registered therein. In a case where it is determined that the topic keyword of interest has not yet been registered, the process proceeds to step S34. In step S34, the topic keyword manager 12 controls the topic keyword table generator 42 to create a new topic keyword table on the basis of the topic keyword of interest and register it in the topic keyword table database 13.

The topic keyword table is a table in which the number of occurrences of a topic keyword, the date/time at which the topic keyword was last acquired, and the importance level of the topic keyword are described in association with the topic keyword. When a new topic keyword table is created, as a matter of course, the number of occurrences is set to 1, and the last acquisition time is set to the date/time at which the topic keyword was acquired. The importance level is defined such that a greater value indicates greater importance. Thus, when a new topic keyword table is created, the importance level is set to 1.

In step S35, the topic keyword manager 12 determines whether there are more unprocessed topic keywords. If an unprocessed topic keyword is found, the process returns to step S32.

In a case where it is determined in step S33 that the topic keyword of interest has already been registered in the topic keyword table database 13, the process proceeds to step S35. In step S35, the topic keyword manager 12 controls the number-of-occurrences manager 41 to increment the number of occurrences of the topic keyword of interest by one in the topic keyword table.

That is, if a topic keyword that has not yet been registered is received, a topic keyword table is created. However, if a received topic keyword has already been registered, the number of occurrences thereof is incremented by one. Thus, the number of occurrences is managed in the process from step S32 to step S36.

In a case where it is determined in step S36 that there is no more unprocessed topic keyword, the process proceeds to step S37. In step S37, the topic keyword manager 12 selects one of the topic keywords registered in the topic keyword table database 13, and reads a topic keyword table associated with the selected topic keyword.

In step S38, the topic keyword manager 12 controls the importance level manager 43 to calculate the difference in units of hours between the current time and the last acquisition time of the selected topic keyword described in the topic keyword table.

In step S39, the topic keyword manager 12 controls the importance level manager 43 to calculate the importance level of the selected topic keyword by subtracting 0.5 times the calculated time difference from the number of occurrences described in the topic keyword table. In a case where the result is negative, the importance level is set to 0.

In step S40, the topic keyword manager 12 determines whether there are more registered topic keywords which have not been subjected to the calculation of the importance level. If a topic keyword is found which has not been subjected to the calculation of the importance level, the process returns to step S37. That is, the process from step S37 to step S40 is performed repeatedly until all topic keywords registered in the topic keyword table database 13 have been subjected to the process. If it is determined that all topic keywords registered in the topic keyword table database 13 have been subjected to the process, the process is ended.

Figure 4:
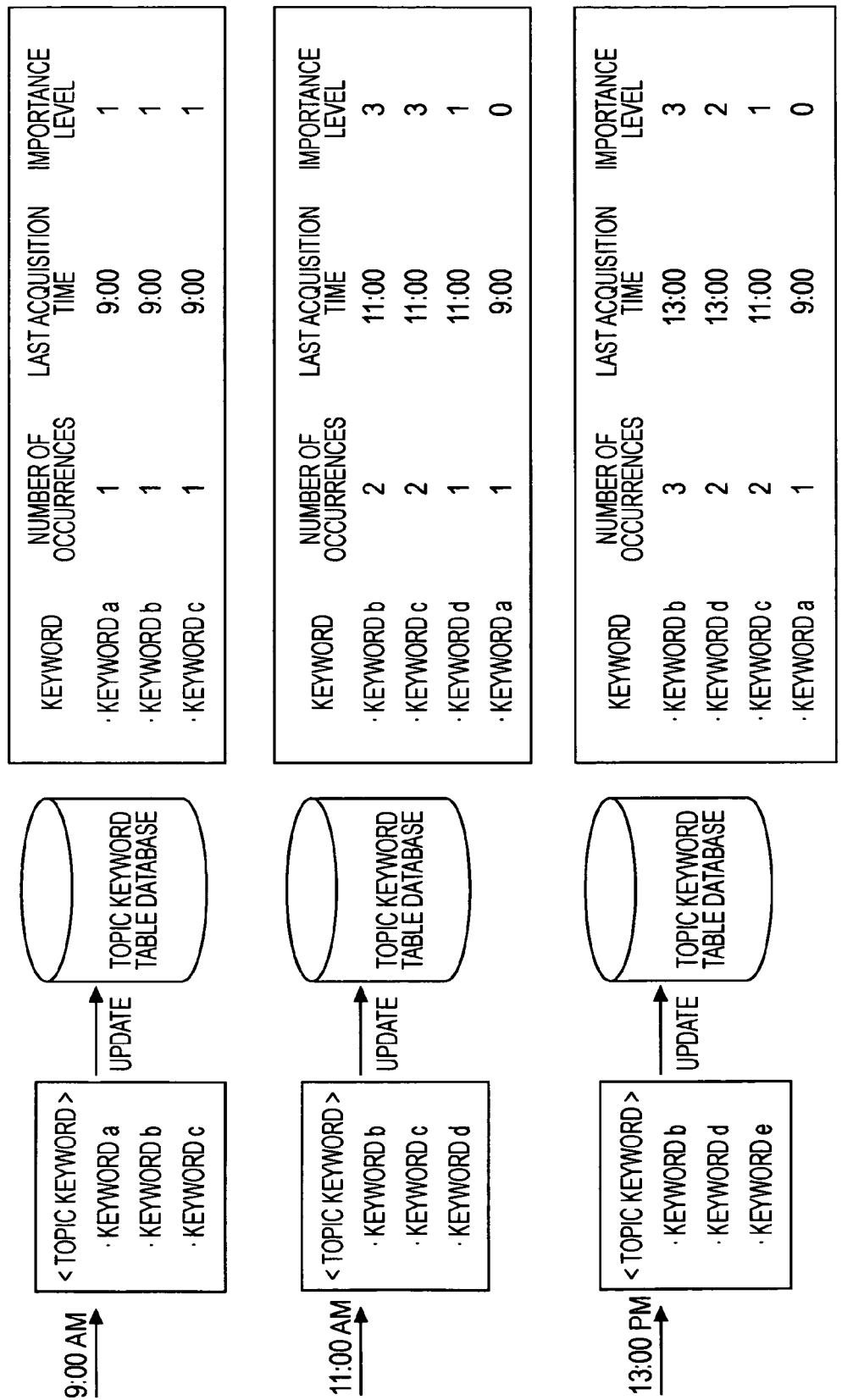
FIG. 4 is a diagram provided for an explanation of a topic keyword registration process.

For example, in a case where topic keywords a, b, and c that have not yet been registered are received for the first time at 9:00 AM, topic keyword tables associated with the respective topic keywords a, b, and c are created, and the number of occurrences is set to 1, the last acquisition time is set to 9:00 AM, and the importance level is set to 1 in each topic keyword table, and the resultant topic keyword tables are stored in the topic keyword table database 13, as shown on the top of FIG. 4.

Thereafter, if topic keywords b, c, and d are received at 11:00, as shown in the middle of FIG. 4, a new topic keyword table associated with the topic keyword d is created, and the number of occurrences is set to 1, the last acquisition time is set to 11:00, and the importance level is set to 1 in this topic keyword table. For the topic keywords b and c, the topic keyword tables are updated as follows. The number of occurrences is incremented by 1 and thus is updated to 2, and the last acquisition time is updated to 11:00. In this case, the time difference is 0, and thus the importance level is updated to 2 (=2−0). For the topic keyword a, the topic keyword table is updated as follows. The number of occurrences is maintained at the current value 1, and the last acquisition time is also maintained at 9:00, because no new occurrence of the topic keyword a has been observed. The time difference is 2 hours, and thus the importance level is set to 0 (=1−2×0.5).

Furthermore, if topic keywords b, d, and e are received at 13:00, as shown on the bottom of FIG. 4, the topic keyword table associated with the topic keyword b is updated as follow. That is, the number of occurrences is incremented by 1 and thus is updated to 3, and the last acquisition time is updated to 13:00. The time difference is 0, and thus the importance level is updated to 3 (=3−0). The topic keyword table associated with the topic keyword c is processed as follows. The number of occurrences is maintained at the current value 2, and the last acquisition time is maintained at 11:00. The time difference is 2 hours, and thus the importance level is updated to 1 (=2−2×0.5). The topic keyword table associated with the topic keyword d is updated as follows. The number of occurrences is incremented by 1 and thus updated to 2, and the last acquisition time is updated to 13:00. The time difference is 0, and thus the importance level is updated to 2 (=2−0). The topic keyword table associated with the topic keyword a is processed as follows. Because no new occurrence of the topic keyword a has been observed, the number of occurrences is maintained at the current value 1, and the last acquisition time is maintained at 9:00. The time difference is 4 hours, and thus the importance level is set to 0 (=1−4×0.5).

Thus, in the process described above, the topic keyword table associated with the received topic keyword is produced and stored in the topic keyword table 13. In the topic keyword table, the number of occurrences, the last acquisition time, and the importance level are described in association with the topic keyword. The importance level increases with the number of occurrences, and a lower value is assigned to an older topic keyword.

As a result, the greater the number of occurrences of the topic keyword and the newer the topic keyword is, the topic keyword has a greater importance level, while the smaller the number of occurrences of the topic keyword and the older the topic keyword is, the topic keyword has a lower importance level. Thus, the importance level indicates how frequently the topic keyword has been talked recently.

In the present embodiment, the importance level is given by the number of occurrences minus 0.5 times the time difference. Alternatively, the importance level may be determined differently as long as the importance level increases with the number of occurrences and decreases with the time difference.

Returning to the flow chart shown in FIG. 2, the explanation is continued below.

If the topic keyword extraction process in step S12 is completed, then in step S13, the subtitle keyword extraction process is performed.

Figure 5:
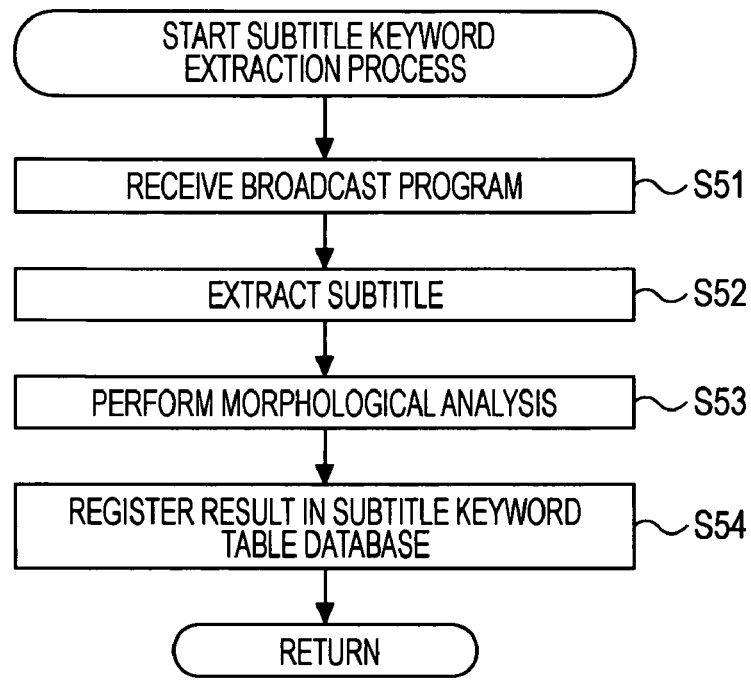
FIG. 5 is a flow chart associated with a subtitle keyword extraction process.
Figure 6:
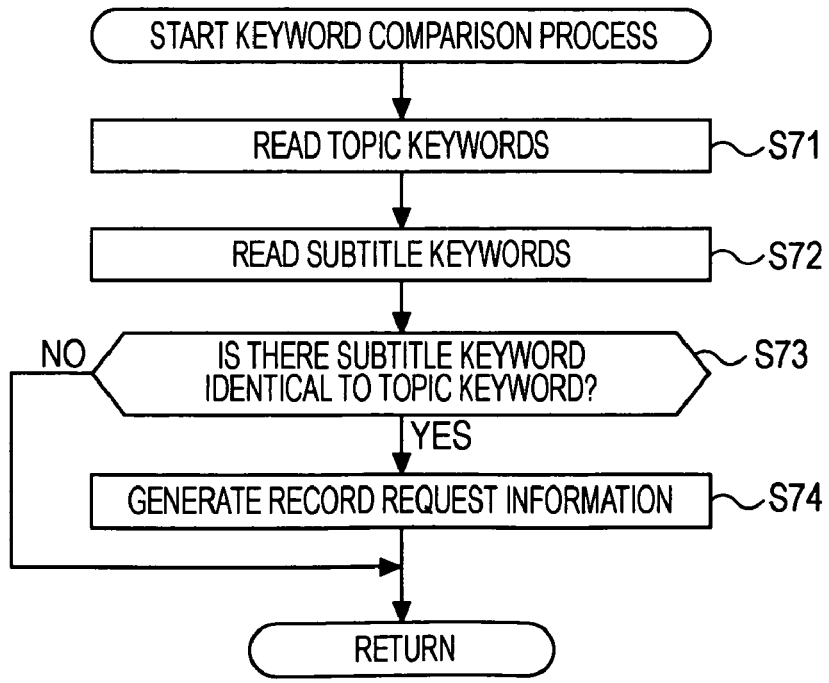
FIG. 6 is a flow chart associated with a keyword comparison process.

The subtitle keyword extraction process is described below with reference to a flow chart shown in FIG. 5.

In step S51, the receiving unit 14 receives, via the antenna 15, a broadcast program signal transmitted in the form of a broadcast wave and supplies the received signal to the subtitle extractor 15, the program recording unit 20, and the content table manager 22.

In step S52, the subtitle extractor 15 extracts subtitle information from the received broadcast program signal and supplies the extracted subtitle information to the subtitle keyword extractor 16.

In step S53, the morphological analyzer 61 of the subtitle keyword extractor 16 performs morphological analysis on the subtitle information supplied from the subtitle extractor 15 and determines the part of speech of each keyword.

In step S54, the subtitle keyword table manager 62 produces a subtitle keyword table in which a channel and keywords are described, and registers the produced subtitle keyword table in the subtitle keyword table database 17.

Thus, in the process described above, the subtitle keyword table is produced from the subtitle information of the channel received by the receiving unit 14 and the produced subtitle keyword table is registered in the subtitle keyword table database 17. As a result, keywords included in the subtitle information are registered in association with the channel.

Returning to the flow chart shown in FIG. 2, the explanation is continued below.

If the subtitle keyword extraction process in step S13 is completed, then the process proceeds to step S14 to perform a keyword comparison process.

Figure 7:
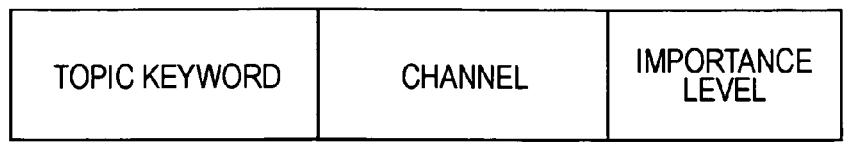
FIG. 7 is a diagram illustrating an example of record request information.

Referring to a flow chart shown in FIG. 7, the keyword comparison process is explained below.

In step S71, the keyword comparison unit 18 accesses the topic keyword table database 13 to read registered topic keyword tables.

In step S72, the keyword comparison unit 18 accesses the subtitle keyword table database 17 and reads subtitle keyword tables associated with one subtitle from the subtitle keyword table database 17.

In step S73, the keyword comparison unit 18 compares each subtitle keyword described in the registered subtitle keyword tables with each topic keyword described in the topic keyword table, and determines whether the subtitle keyword tables include a subtitle keyword identical to any topic keyword described in the topic keyword tables.

In a case where it is determined in step S73 that a subtitle keyword identical to a topic keyword described in the topic keyword tables is detected in the registered subtitle keyword tables, the processing flow proceeds to step S74. In step S74, the keyword comparison unit 18 determines that a scene of a topic represented by the detected topic keyword is being broadcast, and the keyword comparison unit 18 supplies information associated with the subtitle keyword table and the topic keyword table to the record request information generator 19. In accordance with the supplied information associated with the subtitle keyword table and the topic keyword table, the record request information generator 19 produces record request information such as that shown in FIG. 7 and supplies the produced record request information to the program recording unit 20. As shown in FIG. 7, the record request information is described in the form of a table in which the channel and the importance level are described in association with the topic keyword.

On the other hand, in a case where it is determined in step S73 that the subtitle keyword tables include no subtitle keyword identical to any topic keyword described in the topic keyword tables, step S74 is skipped, and the process is ended.

Thus, in the process described above, the determination is made as to whether subtitle information of a program being currently broadcast includes any topic keyword. If it is determined that subtitle information of a program being currently broadcast includes a topic keyword, it is determined that a scene of the program being currently broadcast is of a topic represented by the topic keyword, and thus record request information is produced to record the program.

Returning to the flow chart shown in FIG. 2, the explanation is continued below.

If the keyword comparison process in step S14 is completed, then in step S15, a keyword-based recording process is performed.

Referring to a flow chart shown in FIG. 8, the keyword-based recording process is explained below.

In step S91, the program recording unit 20 determines whether record request information has been received from the record request information generator 19. For example, in a case where record request information is produced and transmitted in step S74 described above, the determination in step S91 is affirmative, and thus the processing flow proceeds to step S92.

In step S92, the program recording unit 20 records the program specified by the record request information for a predetermined period starting at the time at which the record request information is received, and the program recording unit 20 sequentially stores the recorded program (content) information in the recorded program data storage unit 23. In this recording process, the program recording unit 20 supplies the record request information and information indicating the record start time to the content table manager 22 and the topic keyword content table manager 24.

In step S93, the content table manager 22 controls the EPG acquisition unit 24a to acquire the title such as "News xxx" of the program.

In step S94, the content table manager 22 produces a content table in accordance with the record request information and registers the produced content table in the content table database 23. More specifically, for example, in a case where the record request information is such as that shown on the top of FIG. 9, a content table such as that shown on the bottom of FIG. 9 is produced. In the example of the record request information shown on the top of FIG. 9, "General Election" is registered as the topic keyword, channel 6 is specified, and an importance level of 6 is assigned. In this specific case, the content table manager 22 generates, for example, "00001" as the content table ID and assigned it to the content table as shown in the middle of FIG. 9. The content table manager 22 adds further information to the content table. More specifically, "News xx" acquired by the EPG acquisition unit 24a is described as the title of the program, channel 6 is specified as the channel to be recorded, "06/13:10:15" indicating the date and time at which the recording was started is described as the record start time, and "06/13:20:00" at which the recording should be ended is determined from the record start time and described as the record end time. Thus, for example, the content table is produced as shown on the bottom of FIG. 9.

In step S95, the topic keyword content table manager 24 accesses the topic keyword content table database 25 to determine whether any topic keyword included in the record request information has already been registered in the topic keyword content table database 25. In a case where it is determined in step S95 that any of topic keyword included in the record request information has not yet been registered in the form of a topic content table in the topic keyword content table database 25, the processing flow proceeds to step S96.

In step S96, in accordance with the record request information and the content table registered in the content table database 23, the topic keyword content table manager 24 produces a new topic content table and registers it in the topic keyword content table database 25. More specifically, for example, in a case where the record request information shown on the top of FIG. 9 and the content table shown on the bottom of FIG. 9 are given, the topic keyword content table manager 24 produces a new topic keyword content table as shown in the middle of FIG. 9 such that the topic keyword specified by the record request information is described, the importance level indicated by the record request information is described, the total number of contents is defined as 1 because the topic keyword content table is newly produced, and the content ID indicated by the content table is described, and the topic keyword content table manager 24 registers the produced topic keyword content table in the topic keyword content table database 25.

On the other hand in a case it is determined in step S95 that a topic keyword content table associated with the topic keyword described in the record request information is found in the topic keyword content table database 25, the processing flow proceeds to step S97.

In step S97, in accordance with the importance level described in the record request information, the topic keyword content table manager 24 updates the importance level described in the topic keyword content table registered in the topic keyword content table database 25, and adds a new content ID, at the end, to the topic keyword content table. The resultant topic keyword content table is registered in the topic keyword content table database 25. More specifically, for example, in a case where a topic keyword content table similar to that shown in the middle of FIG. 9 already exists as shown on the top of FIG. 10, and a new content table indicates, as shown on the bottom of FIG. 10, that the content ID is "00002", the title is "News xxx", the channel is "4", the record start time is "06/13:11:15", and the record end time is "06/13:11:30", and furthermore, the importance level of the content table to be newly registered is 8, then the topic keyword content table manager 24 updates the topic keyword content table as shown in the middle of FIG. 10, that is, such that the importance level is updated from 6 to 8, the total number of contents is updated from 1 to 2, and "00002" is added at the end as the content ID.

Figure 10:
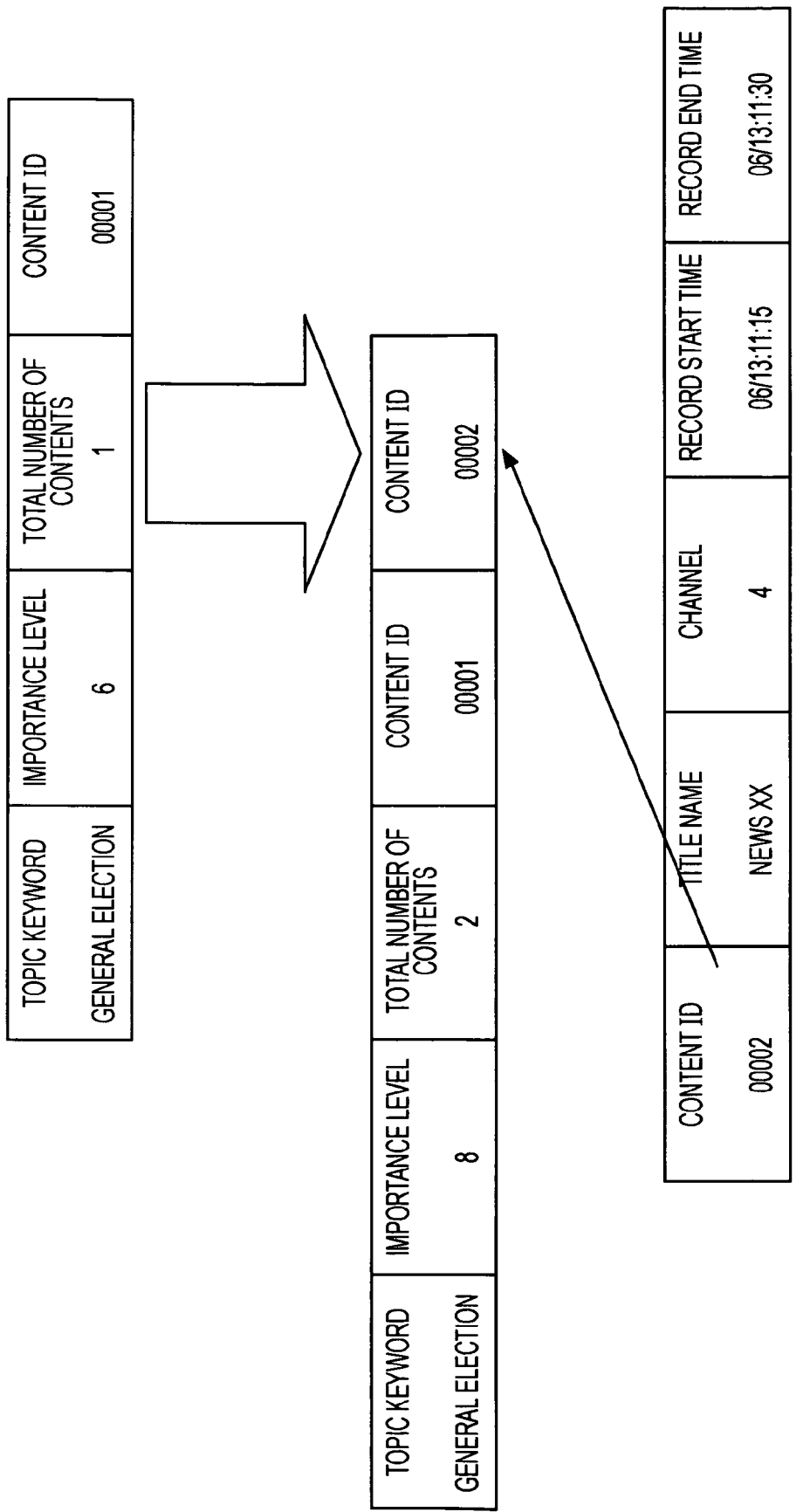
FIG. 10 is a diagram provided for an explanation of a keyword-based recording process.

As a result, as shown in the middle of FIG. 10, the updated topic keyword content table indicates that the topic keyword is "General Election", the importance level is "8", the total number of contents is "2", the content ID identifying the previous content is "0001", and the content ID identifying the new program is "0002". As described above, each time any topic keyword content table is updated, a new content ID is added at the end and the importance level of the topic keyword is updated.

In a case where it is determined in step S91 that no record request information has been yet received, the process from step S92 to step S97 is skipped, and the process is ended.

Thus, in the process described above, in response to receiving record request information, a specified program is recorded for a predetermined period, and information associated with the recorded program is registered as a content table in the content table database 23 and as a topic keyword content table in the topic keyword content table database 25.

Returning to the flow chart shown in FIG. 2, the explanation is continued below.

If the keyword-based recording process in step S15 is completed, the processing flow proceeds to step S16. In step S16, the subtitle extractor 15 determines whether a next subtitle has been supplied. If a next subtitle has been supplied, the processing step returns to step S13 to produce a subtitle keyword table and repeat the above-described process. Thus, the process from step S13 to step S16 is performed repeatedly on a subtitle-by-subtitle basis as long as there is a subtitle to process.

In a case where it is determined in step S16 that there is no more subtitle, the processing flow returns to step S11 to repeat the process from step S11.

In the process described above, the recording/playback apparatus 1 is capable of receiving a topic keyword and recording a scene including a subtitle keyword identical to the topic keyword.

Figure 11:
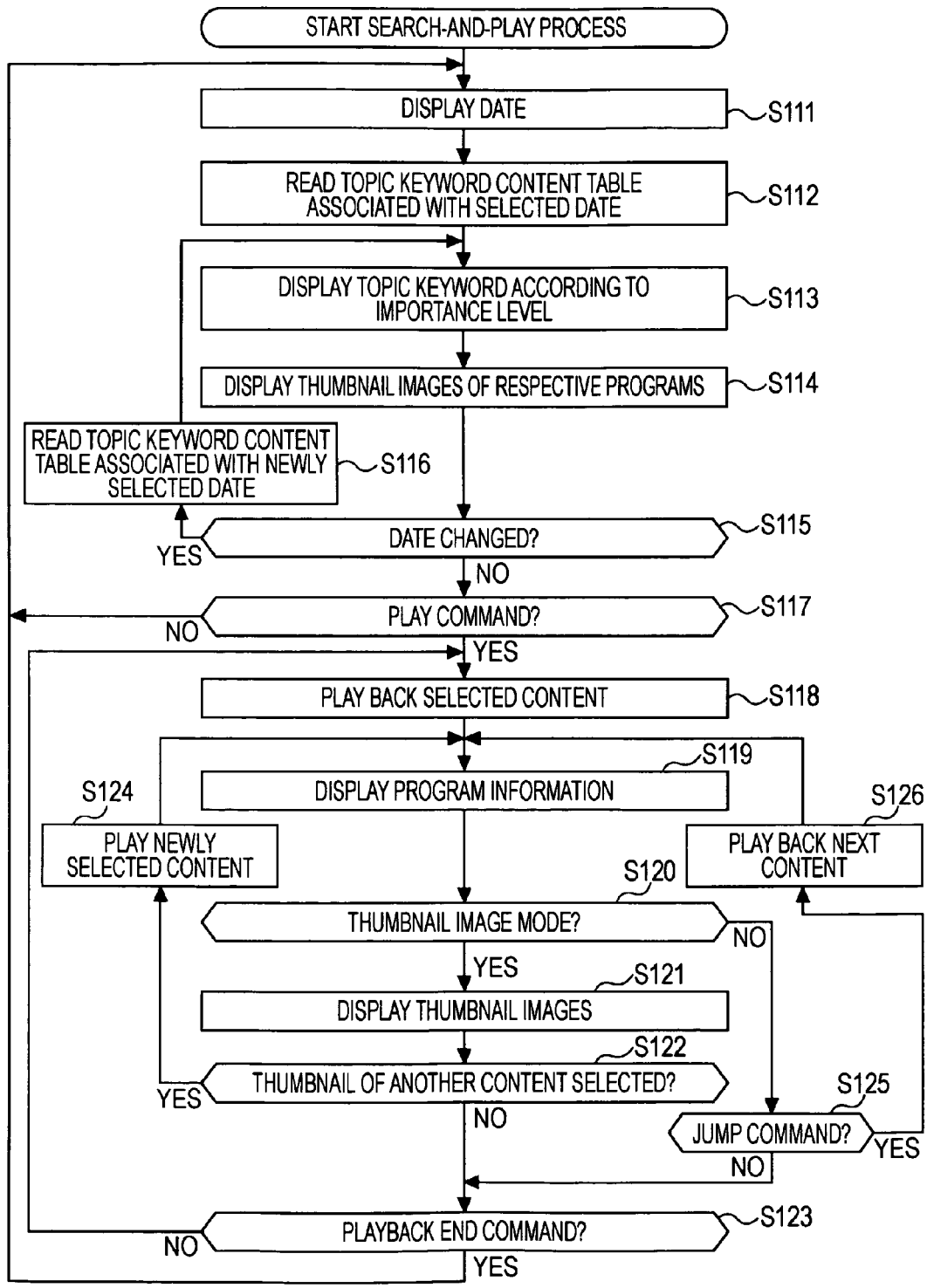
FIG. 11 is a flow chart associated with a search-and-playback process.

In a state in which scenes of topics represented by topic keywords have been recorded via the process described above, it is possible to search for a particular scene and play back the scene as described below with reference to a flow chart shown in FIG. 11.

In step S111, the GUI manager 26 displays a GUI 201 such as that shown in FIG. 12 on the display 5, and the date information generator 91 displays dates in accordance with information indicating record start times described in respective content tables read from the content table database 23.

In the example of the GUI 201 shown in FIG. 12, date information is displayed in the form of icons in date boxes 211 by the date information generator 91. More specifically, "Today" is displayed in a date box 221-1, "Yesterday" is displayed in a date box 221-2, and "05/26" is displayed in a date box 221-3. The icons displayed in the date boxes 221-1 to 221-3 can be selected with a pointer 231 operable via the operation unit 28. In the specific state shown in FIG. 12, the icon of the date box 221-1 is pointed to by the pointer 231 and thus this icon is selected.

In step S112, the topic keyword list generator 95 accesses the content table database 23 and reads a content table corresponding to the selected date.

In step S113, in accordance with information described in the topic keyword content table database 25, the topic keyword list generator 95 displays a topic keyword list indicating topic keywords with high importance levels in a topic keyword list box 212 as shown in FIG. 12. More specifically, the topic keyword list generator 95 reads topic keywords from topic keyword content tables and displays topic keyword icon boxes 241-1 to 241-4 as shown in FIG. 12.

The topic keyword icon display boxes 241-1 to 241-4 each include one of topic keyword display boxes 252-1 to 252-4, and topic keywords are displayed in the respective topic keyword display boxes 252-1 to 252-4. In the specific example shown in FIG. 12, "General Election" is displayed in the topic keyword display box 252-1, "XX Case" is displayed in the topic keyword display box 252-2, "YY Accident" is displayed in the topic keyword display box 252-3, and "ZZ Trial" is displayed in the topic keyword display box 252-4.

In step S114, in accordance with information described in the topic keyword content table database 25, the title thumbnail image generator 94 reads content tables corresponding to the content IDs and detects the record start times of the contents from the content tables. The title thumbnail image generator 94 then accesses the recorded program data storage unit 23 and reads frame images including the subtitle corresponding to the respective record start times. The title thumbnail image generator 94 converts the frame images into the form of thumbnail images and displays the resultant thumbnail images in thumbnail image display boxes 251-1 to 251-4 as shown in FIG. 12. Note that thumbnail images displayed are not limited to those corresponding to the record start time, but thumbnail images corresponding to a proper time after the record start time may be displayed.

In step S115, the GUI manager 26 determines whether the operation unit 28 has been operated to specify a different date. If the pointer 231 is moved, for example, to the date display box 221-2 in FIG. 12, then the determination in step S115 is affirmative, and thus the processing flow proceeds to step S116. In step S116, the GUI manager 26 reads a topic keyword content table corresponding to the newly specified date from the topic keyword content table database 25. The processing flow then returns to step S113. That is, in accordance with the date specified via the pointer 231, information displayed in the topic keyword list display box 212 is changed.

In a case where a change in the specified date is not detected in step S115, the processing flow proceeds to step S117. In step S117, the playback command unit 93 determines whether a playback command has been issued by operating the operation unit 28 so as to click, with a pointer, one of topic keyword icon display boxes 241-1 to 241-4 to be played back. If it is determined that issuing of the playback command is not detected, the processing flow returns to step S111.

In the process described above, topic keywords are displayed in the order of decreasing importance level for each date so that a user can easily understand which topic is more frequently talked.

In a case where, for example, the icon of the topic keyword icon display box 241-1 is selected with the pointer 231' as shown in FIG. 12, it is determined in step S117 that a command to play a content related to a topic keyword "General Election" has been issued, and thus the processing flow proceeds to step S118.

In step S118, the playback command unit 93 commands the playback unit 27 to play the specified content. In the specific example shown in FIG. 12, the content associated with the content ID with the highest priority (of the content IDs, one located at a leftmost position in FIG. 10) described in the topic keyword content table pointed to by the pointer 231' is specified to be played back. The playback unit 27 searches the recorded program data storage unit 23 in accordance with the specified content ID and reads the content corresponding to the content ID. The read content is displayed on the display 5.

In step S119, the playback program information generator 92 accesses the content table database 23 in accordance with the content ID and reads a content table corresponding to the content ID. In accordance with the read content table, the playback program information generator 92 displays a station name display box 311, a program title display box 312, and a topic keyword display box 313 such that they are superimposed on the image 301 being displayed, as shown in FIG. 13. In the example shown in FIG. 13, "XX Station" is displayed in the station name display box 311, "Noon News XX" is displayed in the program title display box 312, and "General Election" is displayed in the topic keyword display box 313. Displaying of information in such a manner allows a user to easily understand what content is being played back.

In step S120, the title thumbnail image generator 94 determines whether the current operation is in a mode in which thumbnail images are displayed on the image screen 301 (hereinafter, this mode will be referred to simply as a thumbnail image mode). The thumbnail image mode may be switched on/off by clicking a particular icon (not shown). In a case where it is determined in step S120 that the thumbnail image mode is enabled, the processing flow proceeds to step S121. In step S121, the title thumbnail image generator 94 displays selectable thumbnail images, for example, as shown in FIG. 14. In the example shown in FIG. 14, thumbnail image display boxes 321-1 to 321-4 are displayed in an area below the image area 301. Note that all thumbnail images displayed in these thumbnail image display boxes 321-1 to 321-4 correspond to content IDs described in the topic keyword content table associated with the topic "General Election". Any of these thumbnail images can be selected using a pointer.

In step S122, the playback command unit 93 determines whether the pointer has been moved to another one of thumbnail image display boxes 321-1 to 321-4 to specify another content. For example, in FIG. 14, if the thumbnail image display box 321-3 is selected, then in step S124, the playback command unit 93 commands the playback unit 27 to play the newly selected content in accordance with the content ID described in the corresponding topic keyword content table. The processing flow then returns to step S119. As a result, information displayed on the screen is switched. In the example shown in FIG. 14, in response to newly selecting the thumbnail image display box 321-3, an image of "5-O'clock News XX" is displayed in the playback image area 301, "XX Station" is displayed in the station name display box 311, "5-O'clock News XXX" is displayed in the program title display box 312, and "General Election" is displayed in the topic keyword display box 313.

On the other hand, in a case where it is determined in step S122 that the selected thumbnail image of the content is not changed, the processing flow proceeds to step S123. In step S123, the playback command unit 93 determines whether a playback end command has been issued. In a case where the playback end command has not been issued (or the end of the content being played has not yet been reached), the processing flow returns to step S118. On the other hand, in a case where it is determined in step S123 that the playback end command has been issued or the end of the content has been reached, the processing flow returns to step S111.

In a case where it is determined in step S120 that the thumbnail image mode is disabled, the processing flow proceeds to step S125. In step S125, the playback command unit 93 determines whether the operation unit 28 has been operated to issue a content jump command. If it is determined that the content jump command has not been issued, the processing flow proceeds to step S123. Thus, when the thumbnail image mode is disabled, the playback is performed without displaying thumbnail image display boxes 321-1 to 321-4 as shown in FIG. 13.

In a case where it is determined in step S125 that the jump command has been issued, the processing flow proceeds to step S126. In step S126, the playback command unit 93 commands the playback unit 27 to display a content with an immediately next content ID (in the example shown in FIG. 10, a content ID described at a position right to the previous content ID). The processing flow then returns to step S119.

In the process described above, a content is searched for, and a detected content is played back. When the content is being played back, information associated with the content is also displayed so that a user can easily understand what content is being played back. Furthermore, the user is allowed to easily select a content to be played back. Because recorded contents are grouped according to the topic keyword, the content being displayed in the mode shown in FIG. 13 in which no thumbnail images are displayed is switched to another content associated with the same topic keyword each time the jump command is issued. This allows a user to quickly select and view many contents associated with the same topic keyword. On the other hand, in the mode in which thumbnail images are displayed, thumbnail images of recorded contents associated with the same topic keyword are displayed so that a user can easily and quickly select and view many contents associated with the same topic keyword.

Thus, simply by receiving topic keywords, the recording/playback apparatus is capable of recording scenes of topics in programs with subtitle information including keywords identical to the topic keywords.

In the embodiments described above, the recording/playback apparatus is configured to receive topic keywords and record scenes in accordance with the received topic keywords. Alternatively, the recording/playback apparatus may be configured to search for a scene of a topic represented by an input topic keyword from already recorded contents including subtitle information, and the recording/playback apparatus may play back a detected scene. In this case, the operation can be performed in a similar manner to the embodiments described above except that contents received via broadcast waves are replaced by already recorded contents, and thus no further explanation thereof is given herein.

As described above, the embodiments of the present invention make it possible to detect a scene of a recent popular topic from programs, and record and play back the detected scene.

The sequence of processing steps described above may be performed by hardware or software. When the processing sequence is executed by software, the software in the form of a program may be installed from a storage medium onto a computer which is provided as dedicated hardware or may be installed onto a general-purpose computer capable of performing various processes in accordance with various programs installed thereon.

FIG. 15 illustrates an example of a configuration of a general-purpose personal computer. The computer includes a CPU (Central Processing Unit) 1001. An input/output interface 1005 is connected to the CPU 1001 via a bus 1004. The bus 1004 is also connected to a ROM (Read Only Memory) 1002 and a RAM (Random Access Memory) 1003.

The input/output interface 1005 is connected to an input unit 1006 including a keyboard used by a user to input an operation command or data and an input device such as a mouse, an output unit 1007 adapted to output a playback image and a GUI image to the display, a storage unit 1008 such as a hard disk drive for storing programs and associated data, and a communication unit 1009 including a LAN (Local Area Network) adapter or the like for performing communication via a network such as the Internet. The input/output interface 1005 is also connected to a drive 1010 adapted to read/write data from/to a removable medium 1011 such as a magnetic disk (for example, a floppy disk), an optical disk (for example, a CD-ROM (Compact Disc-Read Only Memory), DVD (Digital Versatile Disk), etc.), a magneto-optical disk (for example, MD (Mini Disc)), or a semiconductor memory.

The CPU 1001 executes various kinds of processing in accordance with a program stored in the ROM 1002 or in accordance with a program read from the removable medium 1011 such as a magnetic disk, an optical disk, a magneto-optical disk, or a semiconductor memory into the storage unit 1008 and further into the RAM 1003. The RAM 1003 is also used to store data used by the CPU 1001 in the execution of various processes.

In the present description, the steps described in the program stored in the storage medium may be performed either in time sequence in accordance with the order described in the program or in a parallel or separate manner.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
an acquisition device connectable to a server by way of a network to acquire one or more distributed keywords;
a central processing unit to determine an importance level of each keyword acquired by the acquisition device,
wherein, when the respective keyword is registered, the central processing unit calculates the importance level the respective keyword by subtracting a time difference value from a number of occurrences of the respective keyword, in which the time difference value is equal to a predetermined value times a difference between a current time and a last acquisition time of the respective keyword, and wherein, when a result of subtracting the time difference value from the number of occurrences of the respective keyword is negative, the importance level of the respective keyword is set to zero, and
wherein, when the respective keyword is not registered, the central processing unit sets the importance level of the respective keyword to one;
extraction means for extracting text information of a subtitle included in a program;
subtitle morphological analysis means for performing morphological analysis on the text information of the subtitle;
comparison means for comparing each keyword acquired by the acquisition device with each keyword detected via the morphological analysis performed by the subtitle morphological analysis means;
recording means for recording the program if the comparison performed by the comparison means indicates that any keyword acquired by the acquisition device is identical to any keyword detected via the morphological analysis performed by the subtitle morphological analysis means; and
registration means for registering, in a table, the program recorded by the recording means and information indicating the importance level in association with the keyword.

2. The information processing apparatus according to claim 1, further comprising display means for displaying information associated with one or more programs registered in the table, in the order of decreasing importance level of topic keywords and in the order of decreasing freshness of time of recording.

3. The information processing apparatus according to claim 2, further comprising:
selection means for selecting information associated with a program registered in the table from one or more pieces of information displayed by the display means; and
playback means for playing back the program selected by the selection means.

4. An information processing method comprising the steps of:
acquiring one or more distributed keywords;
determining an importance level of each keyword acquired in the acquisition step,
wherein, when the respective keyword is registered, the importance level is calculated by subtracting a time difference value from a number of occurrences of the respective keyword, in which the time difference value is equal to a predetermined value times a difference between a current time and a last acquisition time of the respective keyword, and wherein, when a result of subtracting the time difference value from the number of occurrences of the respective keyword is negative, the importance level of the respective keyword is set to zero, and
wherein, when the respective keyword is not registered, the importance level of the respective keyword is set to one;
extracting text information of a subtitle included in a program;
performing morphological analysis on the text information of the subtitle;
comparing each keyword acquired in the acquisition step with each keyword detected via the morphological analysis performed in the subtitle morphological analysis step;
recording the program if the comparison performed in the comparison step indicates that any keyword acquired in acquisition step is identical to any keyword detected via the morphological analysis performed in the subtitle morphological analysis step; and
registering, in a table, the program recorded by the recoding step and information indicating the importance level in association with the keyword.

5. A storage medium having stored thereon a computer program executable by a computer to perform a process comprising the steps of:
acquiring one or more distributed keywords;
determining an importance level of each keyword acquired in the acquisition step,
wherein, when the respective keyword is registered, the importance level is calculated by subtracting a time difference value from a number of occurrences of the respective keyword, in which the time difference value is equal to a predetermined value times a difference between a current time and a last acquisition time of the respective keyword, and wherein, when a result of subtracting the time difference value from the number of occurrences of the respective keyword is negative, the importance level of the respective keyword is set to zero, and
wherein, when the respective keyword is not registered, the importance level of the respective keyword is set to one;
extracting text information of a subtitle included in a program;
performing morphological analysis on the text information of the subtitle;
comparing each keyword acquired in the acquisition step with each keyword detected via the morphological analysis performed in the subtitle morphological analysis step;
recording the program if the comparison performed in the comparison step indicates that any keyword acquired in acquisition step is identical to any keyword detected via the morphological analysis performed in the subtitle morphological analysis step; and
registering, in a table, the program recorded by the recoding step and information indicating the importance level in association with the keyword.

6. An information processing apparatus comprising:
an acquisition unit connectable to a server by way of a network and adapted to acquire one or more distributed keywords;
a central processing unit adapted to determine an importance level of each keyword acquired by the acquisition unit, wherein, when the respective keyword is registered, the central processing unit calculates the importance level of the keyword by subtracting a time difference value from a number of occurrences of the respective keyword, in which the time difference value is equal to a predetermined value times a difference between a current time and a last acquisition time of the respective keyword, and wherein, when a result of subtracting the time difference value from the number of occurrences of the respective keyword is negative, the importance level of the respective keyword is set to zero, wherein, when the respective keyword is not registered, the central processing unit sets the importance level of the respective keyword to one;

an extraction unit adapted to extract text information of a subtitle included in a program;

a subtitle morphological analysis unit adapted to perform morphological analysis on the text information of the subtitle; and a comparison unit adapted to compare each keyword acquired by the acquisition unit with each keyword detected via the morphological analysis performed by the subtitle morphological analysis unit.

7. The information processing apparatus according to claim 1, in which the predetermined value is 0.5.

8. The information processing method according to claim 4, in which the predetermined value is 0.5.

9. The storage medium according to claim 5, in which the predetermined value is 0.5.

10. The information processing apparatus according to claim 6, in which the predetermined value is 0.5.

* * * * *